(12) United States Patent
Shoda

(10) Patent No.: US 6,328,507 B1
(45) Date of Patent: Dec. 11, 2001

(54) WORKING TABLE APPARATUS FOR A CUTTING MACHINE TOOL

(75) Inventor: Hiroshi Shoda, Hamamatsu (JP)

(73) Assignee: Shoda Iron Works Co., LTD, Shizuoko-Ken (JP)

( * ) Notice: Subject to any disclaimer, the term of this patent is extended or adjusted under 35 U.S.C. 154(b) by 0 days.

(21) Appl. No.: 09/128,902

(22) Filed: Aug. 4, 1998

(51) Int. Cl.[7] .................................................. B23D 7/08
(52) U.S. Cl. ....................... 409/220; 409/197; 409/219; 269/21
(58) Field of Search .................................. 409/149, 164, 409/197, 219, 220; 408/87, 91; 269/21

(56) References Cited

U.S. PATENT DOCUMENTS

| | | | |
|---|---|---|---|
| 3,039,332 | * | 6/1962 | Johnson .................................... 77/62 |
| 3,376,764 | * | 4/1968 | Schardt .................................... 77/64 |
| 3,396,493 | * | 8/1968 | Irish ......................................... 51/53 |
| 3,760,652 | * | 9/1973 | Joyard et al. ........................... 74/527 |
| 4,593,450 | * | 6/1986 | Dumire .................................... 29/559 |
| 4,664,366 | * | 5/1987 | Lane et al. ............................ 269/303 |
| 4,880,218 | * | 11/1989 | Greene .................................... 269/21 |
| 4,901,990 | * | 2/1990 | Frechette ................................ 269/25 |
| 4,946,149 | * | 8/1990 | Greene .................................... 269/21 |
| 5,044,616 | * | 9/1991 | Jakob ..................................... 269/309 |
| 5,152,310 | * | 10/1992 | O'Bryon ................................. 137/15 |
| 5,177,857 | * | 1/1993 | Ito .......................................... 29/559 |
| 5,457,868 | * | 10/1995 | Blaimschein ............................ 29/559 |
| 5,479,723 | * | 1/1996 | Ternes ..................................... 33/623 |
| 5,562,276 | * | 10/1996 | Blick ...................................... 269/20 |
| 5,702,213 | * | 12/1997 | Polacek et al. ....................... 409/218 |
| 5,772,170 | * | 6/1998 | Tsukushi ............................... 248/363 |
| 5,853,169 | * | 12/1998 | Hern et al. ............................. 269/21 |
| 6,095,506 | * | 8/2000 | Schmalz et al. ....................... 269/21 |
| 6,209,188 | * | 4/2001 | Soderberg et al. ..................... 29/559 |

FOREIGN PATENT DOCUMENTS

| | | |
|---|---|---|
| 7118965 | 5/1994 | (JP) . |
| 2503256 | 6/1996 | (JP) . |

* cited by examiner

*Primary Examiner*—S. Thomas Hughes
*Assistant Examiner*—Essama Omgba
(74) *Attorney, Agent, or Firm*—Harness, Dickey & Pierce, P.L.C.

(57) ABSTRACT

A working table apparatus for a cutting machine tool comprising a working table slidably mounted on a bed of the machine tool, and positioning members mounted on the under side of the working table that are selectively projectable from or retractable into a work supporting surface of the working table. The positioning members comprise a group including a first plurality of positioning members arranged in a row either in a direction parallel with the sliding direction of the working table or in a direction perpendicular thereto and at least one second positioning member arranged offset from the row of the first positioning members.

8 Claims, 6 Drawing Sheets

WORKING TABLE APPARATUS FOR A CUTTING MACHINE TOOL

BACKGROUND OF THE INVENTION

1. Field of the Invention

The present invention relates to a cutting machine tool such as for wood working and iron working and, in particular, to a working table apparatus for the cutting machine tool for positioning and securing a work or works thereon.

2. Description of Background Art

In general, with cutting machine tools such as a milling machine or router for wood working, the mounting and removal of a work on the working table of the machine tool has been carried out using clamping members and bolts adapted to be fastened and loosened by a spanner in a well-known manner. More recently, it has been proposed to clamp the wood on a jig secured on the working table using fluidic or electromagnetic force.

Although the conventional clamping apparatus using the clamping members and bolts is easy to manufacture, it is inferior in clamping efficiency and thus its use is limited to single or small-quantity production applications. On the other hand, the automatic or semi-automatic clamping arrangement using the jig, while superior in clamping efficiency, is costly to manufacture and requires substantial time for mounting the jig.

In order to overcome the problems mentioned above, in recent years there has been developed a clamping method in which the work is clamped on a top plate covering the top surface of the working table by negative pressure supplied through suction ports formed in the top plate from a negative pressure chamber formed in the under surface of the top plate (see, for example, Japanese Utility Model Registration Gazette No. 2503256).

However, in high volume production applications, positioning efficiency suffers if the machining specification and the sliding direction of the working table have to be set each time the works are fed onto the working table. Accordingly, it is known to eliminate the positioning adjustment by initially adjusting the position of one or more locating pins or locating blocks on the working table and then positioning the work or works by abutting the reference surface of the work against the locating pins or blocks.

Although the method using locating pins or blocks makes the mounting and removal operation remarkably easy, it also suffers the serious disadvantage that the locating pins or blocks often interfere with tools mounted on the spindles of the machine tool causing damage to either the locating pins or blocks or to the tools.

In addition, the locating pins or blocks must be exchanged whenever works of different sizes are to be machined.

Furthermore, operation of the machine tool must be stopped for a long period of time to mount, adjust, and/or remove a large number of pins or blocks when the works to be machined are small in size or great in number.

In addition, when works are positioned by abutting them against the locating pins or blocks, a positioning error frequently occurs as a result of imperfect contact between the work and the locating pins or blocks.

Moreover, when using negative pressure or electromagnetic force to clamp works onto the working table, the required operating buttons or actuating elements are usually mounted on the bed of the machine tool. Consequently, the distance between the working table and the actuating elements is increased whenever the working table is moved to its extreme positions thus making the clamping operation difficult.

SUMMARY OF THE INVENTION

It is, therefore, an object of the present invention to provide a working table apparatus for a cutting machine tool which overcomes the problems of the prior art mentioned above.

According to the present invention, it is possible to position a work or works on the working table by contacting the sides of the works against positioning members which are selectively projectable from the work supporting surface. No obstacle exists on the working table when the positioning members are retracted therefrom and thus interference between the positioning members and the tools is completely eliminated. The projection and retraction of the positioning members is carried out by fluidic pressure or electromagnetic force.

Further in accordance with the present invention, positioning members are arranged in a row either in a direction parallel with the sliding direction of the working table or in a direction perpendicular thereto. When abutting the reference side of the work against the row of the positioning members, the reference side extends parallel with the moving direction of the working table or perpendicular thereto. The mounted attitude (direction) of the work is thus determined and therefore it is possible to easily drill apertures or to cut a groove parallel with one side of the work.

Since the present invention employs a plurality of positioning members which can be simultaneously projected or retracted, it is possible to project and retract multiple positioning members much more quickly than the time required to separately locate individual positioning members.

Additionally, the positioning members may comprise a first group of positioning members arranged in a row either in a direction parallel with the sliding direction of the working table or in a direction perpendicular thereto and including at least one second positioning member arranged offset from each row. Thus one pair of the first and second positioning members has a substantially L-shaped configuration in its plan view formed by a long side and a short side (or one point).

Accordingly, the work can be positioned by sliding the work on the work supporting surface and abutting its reference side against the positioning members once they are projected from the work supporting surface.

When the reference side of the work is abutted against the first positioning members, the sides of the work assume positions parallel with the edges of the working table. Upon further sliding of the work on the supporting surface and abutting the other side against the second positioning members, the position of the work can be finally determined and thus the work can be clamped at its accurate position.

According to a further aspect of the present invention, since a plurality of groups of positioning members may be formed on the working table, a plurality of works can be simultaneously positioned and worked.

That is, any size or any number of work pieces can be mounted on the working table by using any suitable positioning members in any group of the positioning members.

According to a further feature of the present inventions, it is possible to selectively hold the positioning members in their retracted positions.

This makes it possible to mount a large work on the working table by selectively projecting only the positioning members arranged along the edges of the working table.

According to a further aspect of the present inventions, the actuating elements for the holding means are positioned near the working table (i.e., near an operator regardless of the movement of the working table), enabling easy operation of the actuating elements.

Most preferably, the actuating elements are arranged on the front side of the working table so that the operator can access the actuating elements from either lateral sides of the working table.

The present invention further enables the position and the attitude of the work to be easily determined by abutting the sides of the work against the positioning members, thus enhancing high productivity.

Additionally, the present invention enables the work to be secured on the working table by a negative pressure (i.e., a pressure lower than the atmospheric pressure) acting on the under surface of the work.

After the completion of clamping of the work, the positioning members are retracted below the work supporting surface by the fluidic pressure of the electromagnetic force and thus the interference of the positioning members with the tools during the cutting or other machining operation is avoided.

Finally, the present invention enables the operator to confirm completion of positioning of the work without visual confirmation. This makes the mounting of the work easy and prevents erroneous positioning and thus erroneous machining.

BRIEF DESCRIPTION OF THE DRAWINGS

A preferred embodiment of the present invention will be described with reference to the accompanied drawings in which.

DESCRIPTION OF THE PREFERRED EMBODIMENT

Figure 1:
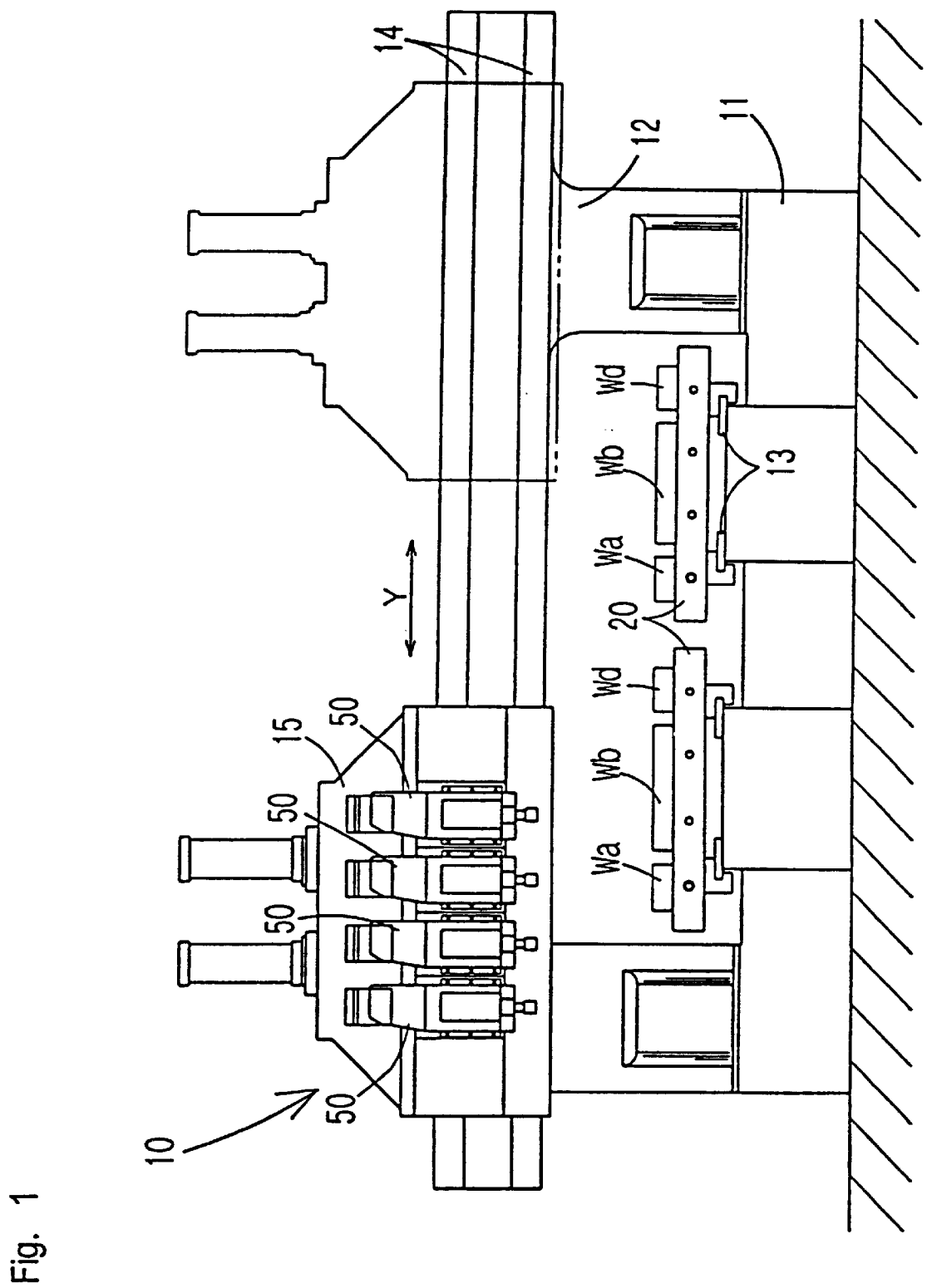
FIG. 1 is a front elevational view of a multi-head wood working router to which principles of the present invention are incorporated.

In FIG. 1 reference numeral 10 denotes a cutting machine tool and, more particularly, a multi-axis router for wood working to which the present invention is incorporated. The machine 10 has a bed 11 to be laid on a floor and a gate-shaped column 12 mounted on the bed 11.

Figure 2:
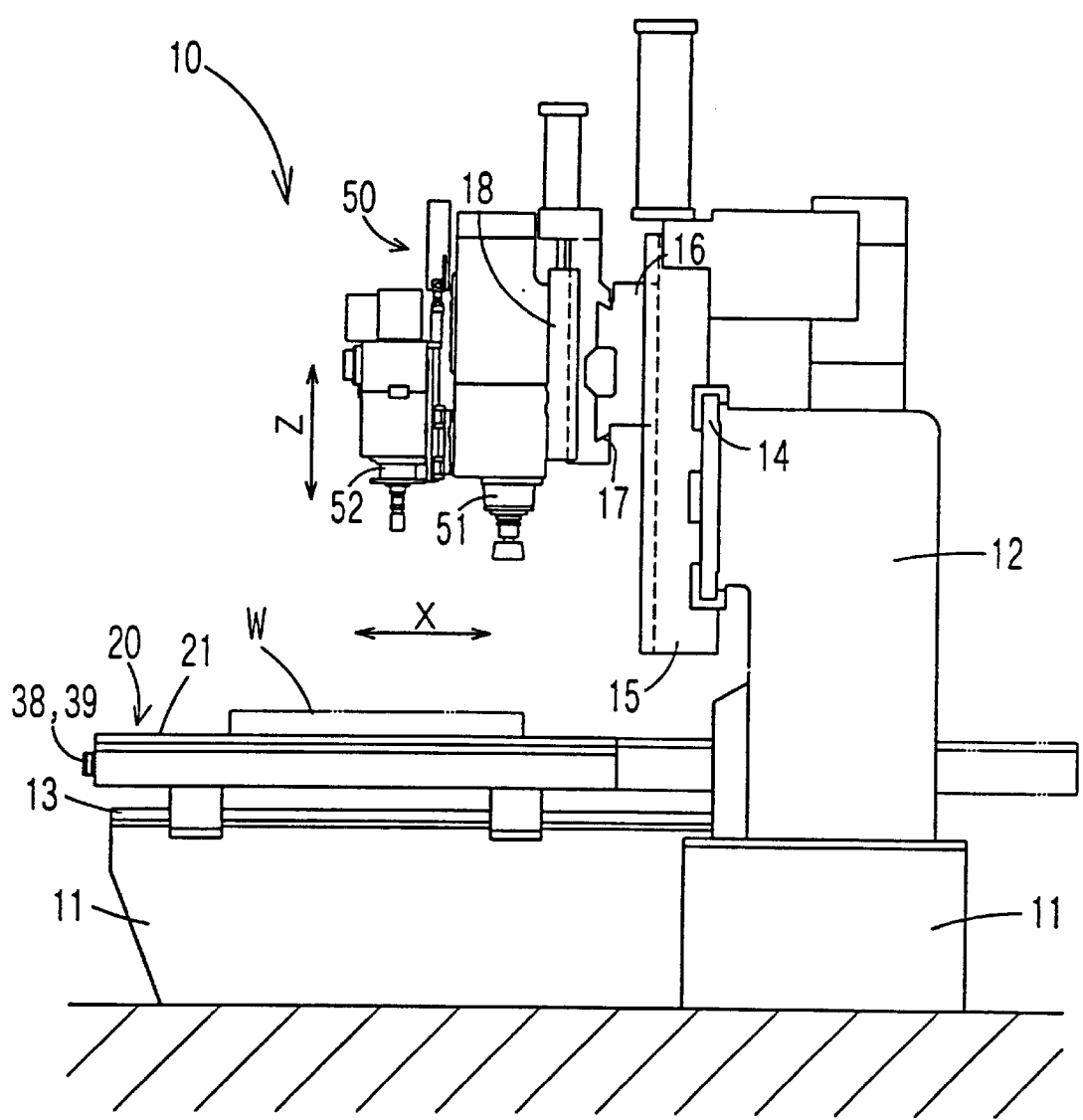
FIG. 2 is a side elevational view of the router of FIG. 1.

The bed 11 is provided with two pairs of sliding rails 13 extending in a direction X (FIGS. 2 and 3), each of which slidably supports a working table 20 on which a work W is mounted.

The gate-shaped column 12 is formed with rails 14 extending in a horizontal direction Y on which a carriage 15 supporting four spindle heads 50 is slidably supported.

Figure 3:
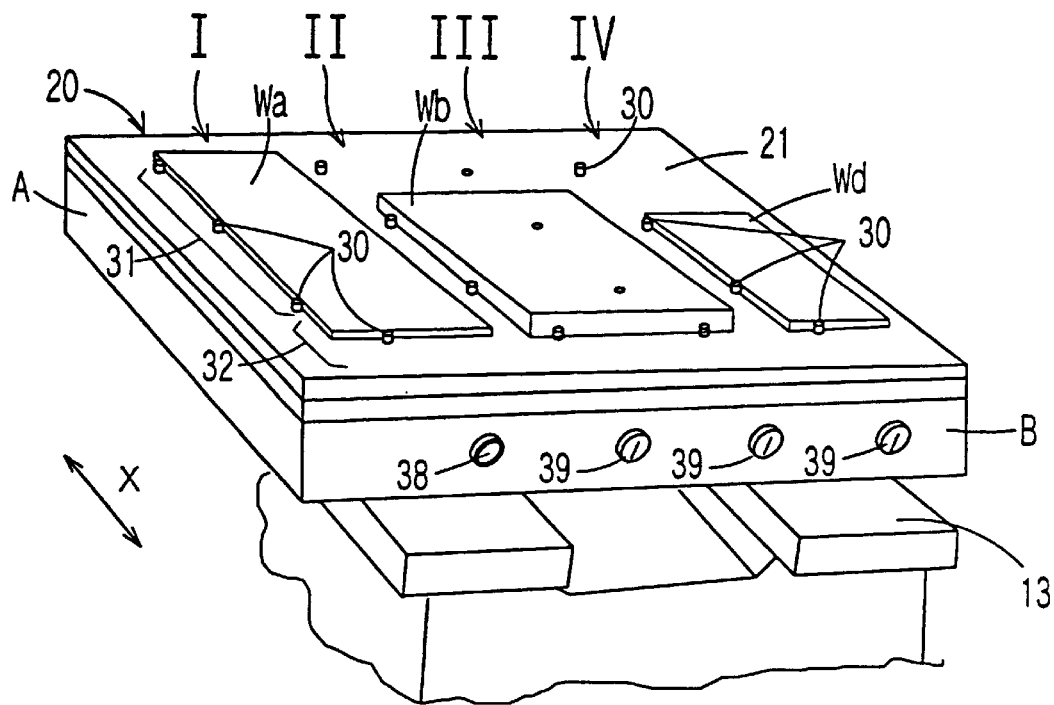
FIG. 3 is an enlarged perspective view showing a working table.
Figure 4:
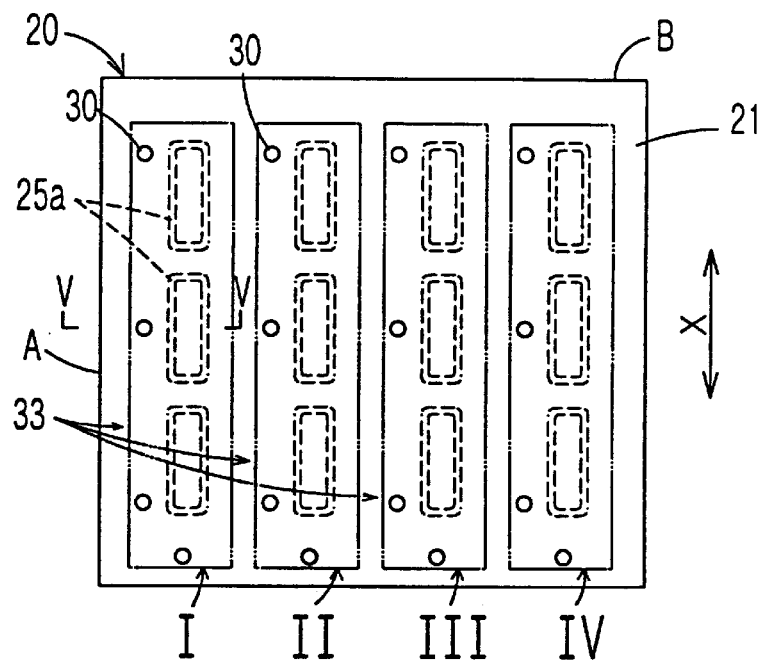
FIG. 4 is a plan view of the working table.
Figure 5:
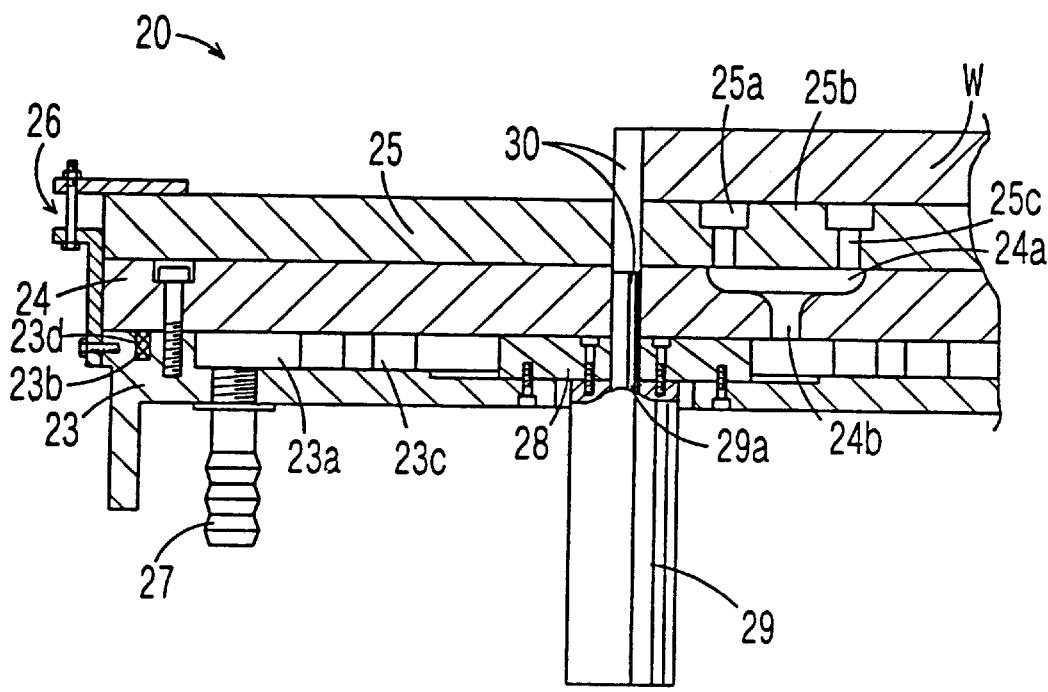
FIG. 5 is a cross-sectional view taken along a line V—V in FIG. 4.

In this embodiment, the working table 20 is a relatively thick plate-like structure having a substantially square configuration in its plan view as shown in FIGS. 3 and 4 and has a work supporting surface 21 on the top thereof. As shown in FIG. 5, the working table 20 is formed by a base frame 23 of steel to be slidably mounted on the bed 11, an auxiliary plate 24 of plastic supported thereon, and a top plate 25 of plywood, all of these plates having substantially the same configuration in plan view and are tightly united by fasteners 26. The top plate 25 is formed with suction grooves 25a adapted to the configuration of the work and can be easily exchanged by loosening the fasteners 26 if damaged during machining of the work.

Figure 6:
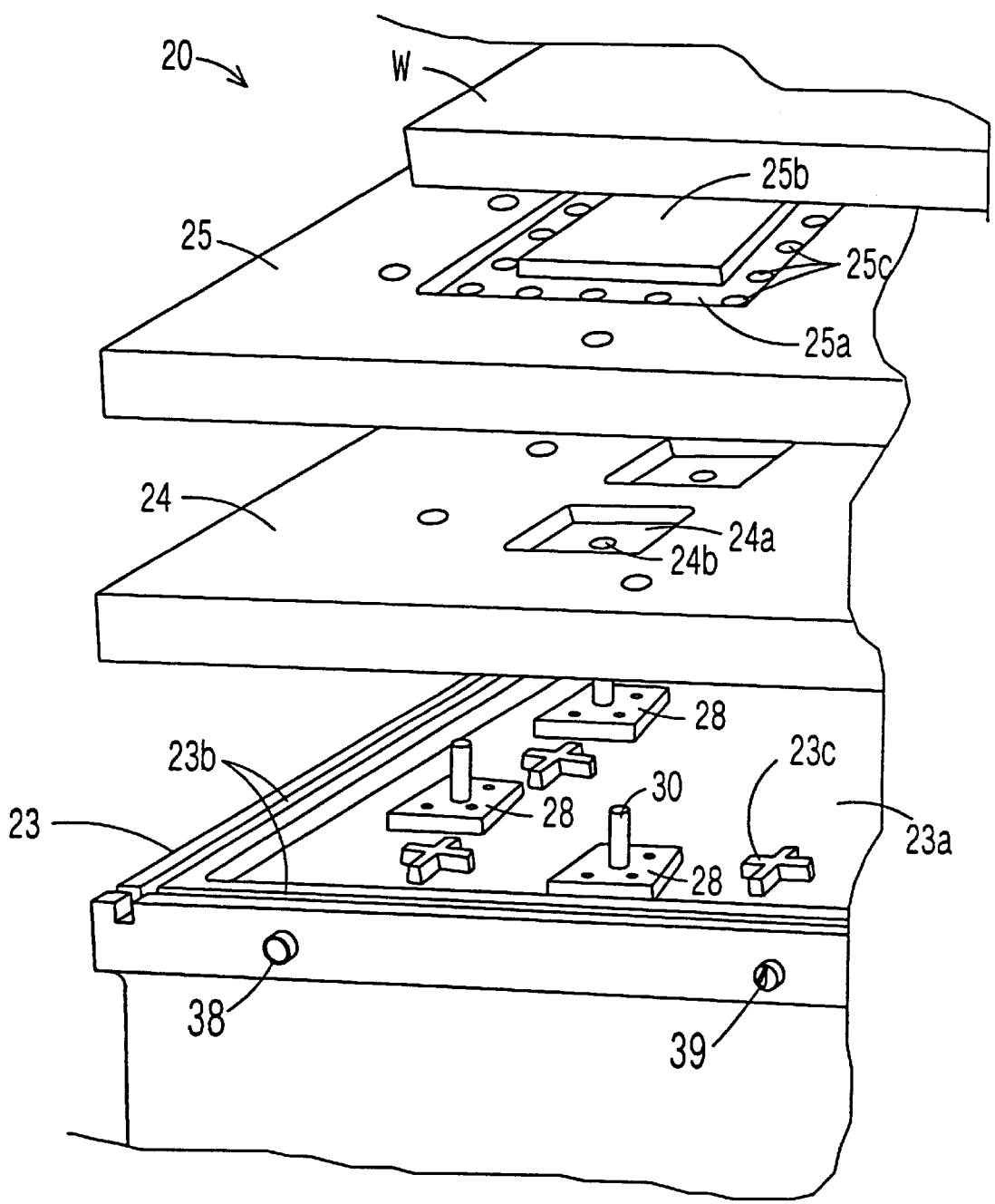
FIG. 6 is an enlarged exploded view of the essential part of the working table.

The top surface of the base frame 23 is formed with a substantially square recess 23a as shown in FIG. 6 with the remaining peripheral portion of the top surface thereof formed with a sealing groove 23b in which string-shaped sealing members 23d of rubber are fitted. A sealed space is thus formed between the base frame 23 and the recess 23a when the auxiliary plate 24 is superposed on the base frame 23. Cross-shaped studs 23c are arranged within the recess 23a at suitable points on the base frame 23 to prevent the auxiliary plate 24 from sagging due to the negative pressure generated in the recess 23a as hereinafter described.

The auxiliary plate 24 is formed with several large and shallow distributing chambers 24a each communicating with the recess 23a through a communicating port 24b. Reference numeral 27 (FIG. 5) denotes a joint for connecting the recess 23a to the suction side of a pump P. Reference numeral 29 denotes a fluidic (air) cylinder and the tip end of the piston rod thereof forms a positioning member 30 to be hereinafter described. Reference numeral 28 denotes a mounting plate bolted within the recess 23a. The cylinder 29 is bolted on the under surface of the mounting plate 28.

Formed on the top surface of the top plate 25 are suction grooves 25a for attracting the work W. One suction groove 25a is formed as a substantially rectangular annulus having a land 25b remaining in the center of the annulus, the land 25b having a level equal to that of the work supporting surface 21. A plurality of ports 25c communicating with the distributing chamber 24a are formed as suction means within the suction groove 25a. When a predetermined level of negative pressure is supplied to the recess 23a via the joint 27, the negative pressure will then propagate to the suction groove 25a through the communicating ports 24b and 25c and finally attract the work W laid on and covering the suction groove 25a to the supporting surface 21.

As shown in FIGS. 3 and 4, piston rods of the fluidic or air cylinders 29 forming positioning members 30 are adapted to project from the top surface of the working table 20. The positioning members comprise a plurality ("three" in the illustrated embodiment of FIGS. 3 and 4) of first positioning members 31 arranged in a row parallel with one side A of the working table 20 and at least one ("one" in the illustrated embodiment of FIGS. 3 and 4) second positioning member 32 arranged offset inside from the row of the first positioning members 31. In the illustrated embodiment of FIGS. 3 and 4, four groups I, II, III, and IV of positioning members, each group forming substantially an L-shaped arrangement, are formed by respective first positioning members 31 and the second positioning members 32. The number of groups is not limited to "four" and any suitable number of groups can be selected. In the illustrated embodiment, three suction grooves 25a are arranged in each group I, II, III, or IV of the positioning members within a region included by the L-shaped arrangement.

In the illustrated embodiment, three first positioning members 31 forming the first group I are arranged in a row parallel with the sliding direction X of the working table 20. Similarly, three positioning members 31 forming each of the second, third, and fourth groups II, III, and IV are arranged inside the first group I (spaced an equal distance away from each other in the illustrated embodiment). The second positioning members 32 of the groups I, II, III, and IV are arranged in a row along a side B adjacent to the side A of the working table 20.

Figure 8:
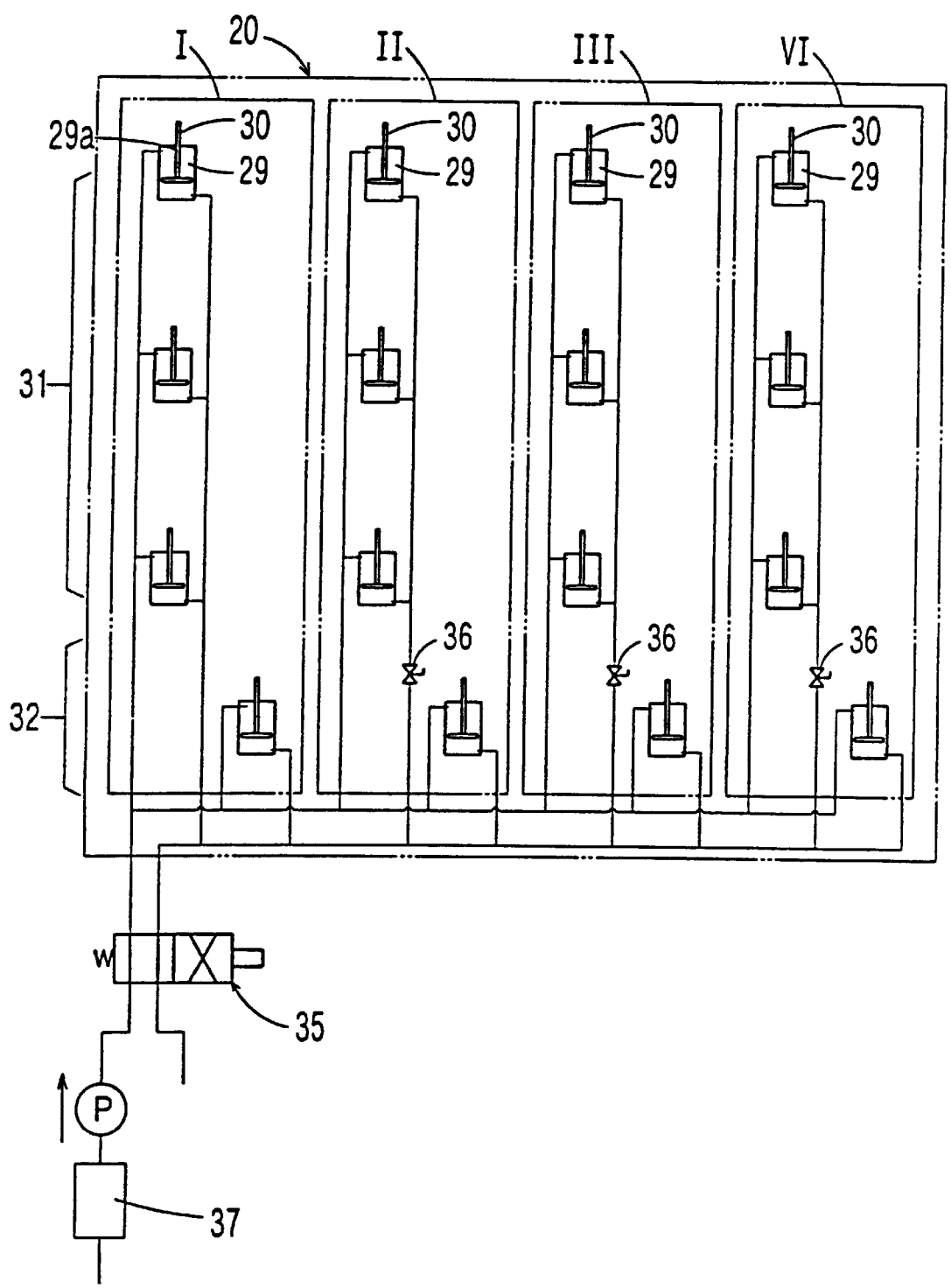
FIG. 8 is a piping diagram between a pump and the positioning members.

As shown in FIG. 8, fluidic cylinders 29 forming the groups I, II, III, and IV of the positioning members are connected to the discharge side of the pump P. In group I, the first positioning members 31 and the second positioning members 32 are connected to the discharge side of the pump P through projection/retraction controlling valves 35 consisting of electromagnetic switching valves. When the valve 35 is set at a left-hand position shown in FIG. 8 and the pump P is actuated, all of the first and second positioning members 30 assume their retracted positions. On the contrary, when the controlling valve 35 is switched and urged to its right-hand position, pressurized air discharged from the pump P is supplied to the lower chamber below the piston of the air cylinder 29 and thus all of the first and second positioning members 30 are projected from the work supporting surface 21.

In groups II through IV, electromagnetic open/close valves 36 are interposed between the lower chambers of the first positioning members 31 and the pump P. Accordingly, when the open/close valves 36 are opened, the circuit deployment in groups II through IV is the same as that of group I previously mentioned and thus all of the first positioning members 31 and the second positioning members 32 are controlled by the controlling valve 35 so that they are simultaneously projected and retracted. On the contrary, when either one of the open/close valves 36 is closed, the lower chambers of the cylinders 29 of the first positioning members 31, to which open/close valves 36 are associated, are isolated from the controlling valve 35 and thus kept in their retracted positions irrespective of the position of the controlling valve 35. That is, the open/close valve 36 forms a holding means for holding the positioning members in their inactive positions. Reference numerals 37, 38, and 39 denote an air cleaner, an operating switch for the projection/retraction controlling valve 35, and an operating switch for the open/close valve 36, respectively.

Figure 7:
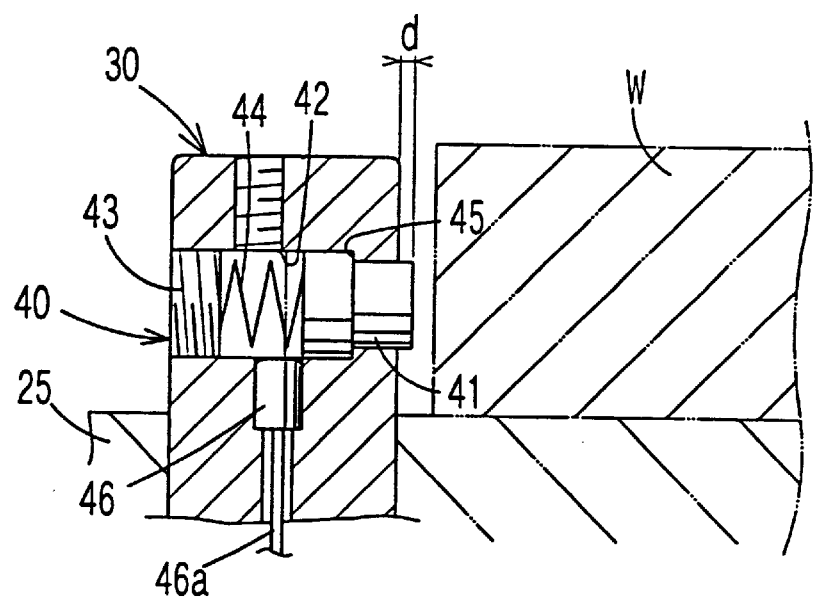
FIG. 7 is an enlarged cross-sectional view of a positioning member.

In FIG. 7, numeral 40 denotes a contact sensor mounted on the distal end of the positioning member 30. A contact element 41 is slidably contained in a lateral bore 42 formed in the distal end of the positioning member 30. The bore 42 is closed by a threaded plug 43. The contact element 41 is urged outward by a coil spring 44 and its outward projection is limited by a shoulder 45 formed in the bore 42 so that the contact element can project from the outer peripheral surface of the positioning member 30 by a distance "d". Reference numeral 46 denotes a proximity switch and numeral 46a denotes its leads.

When the work W contacts the contact element 41 and contacts the outer peripheral surface of the positioning member 30, the contact element 41 is urged within the bore 42 by the work W. The retraction of the contact element 41 is detected by the proximity switch 46 and the operator is informed accordingly via an appropriate warning means such as a lamp or buzzer.

Each spindle head 50 has a main spindle 51 and an auxiliary spindle 52 which is supported on the main spindle in parallel therewith so that it can be elevated independently. Both the main spindle 51 and the auxiliary spindle 52 are movably supported on a vertical slider 16 supported on the carriage 15 and on a horizontal slider 17 supported on the vertical slider 16. Furthermore, the main spindle 51 and auxiliary spindle 52 can be vertically slid via tool exchanging slider 18 supported on the horizontal slider 17.

The foregoing discussion discloses and describes exemplary embodiments of the present invention. One skilled in the art will readily recognize from such discussion, and from the accompanying drawings and claims, that various changes, modifications, and variations can be made therein without departing from the spirit and scope of the invention as defined in the following claims.

What is claimed is:

1. A working table apparatus for a cutting machine tool comprising a working table slidably mounted on a bed of the machine tool, and a multiplicity of cylindrical positioning pins mounted on an under side of the working table and being selectively projectable from and retractable into a work supporting surface of the working table, and control means for selectively controlling the positions of said multiplicity of positioning pins for permitting said positioning pins to be projected from the surface of the working table; wherein said positioning pins comprise a first group of positioning pins including a first plurality of positioning pins arranged in a row either in a direction parallel with the sliding direction of the working table or in a direction perpendicular thereto and a second plurality of positioning pins arranged in a row perpendicular to said first plurality of positioning pins; and at least two additional second and third groups of positioning pins comprising a third and fourth plurality, respectively, of positioning pins each of said third and fourth plurality arranged in a row and positioned parallel to and spaced from said first plurality of positioning pins; and wherein said control means is adapted to simultaneously actuate said first group of positioning pins so that they are simultaneously projected from and retracted into the working table; and further wherein said control means further includes separate holding means associated with each of said at least two additional groups for selectively holding each of said additional groups of positioning pins in their retracted positions.

2. The working table apparatus according to claim 1 wherein said positioning pins are operated by fluidic pressure.

3. The working table apparatus according to claim 2 wherein said control means includes a first control valve for controlling the application of fluidic pressure to said first group of positioning pins.

4. The working table apparatus according to claim 3 wherein said control means further includes separate control valves for selectively controlling the application of fluidic pressure to each of said additional groups of positioning pins.

5. The working table apparatus of claim 4 wherein an actuating element for each control valve is arranged on the working table on a front side of the cutting machine tool.

6. The working table apparatus of claim 1 wherein a plurality of outlet ports of a suction means are opened within a region in the working table between said first plurality and third plurality of positioning pins.

7. The working table apparatus of claim 6 wherein a plurality of outlet ports of a suction means are opened within the various regions in the working table bounded by each of said first, third, and fourth plurality of positioning pins and said second plurality of orthogonally arranged positioning pins.

8. The working table apparatus of claim 1 wherein said positioning pins are provided with contact sensors for detecting contact of the work with the positioning pins.

* * * * *